US009537194B2

(12) United States Patent
Makimoto et al.

(10) Patent No.: US 9,537,194 B2
(45) Date of Patent: Jan. 3, 2017

(54) MULTIMODE RESONATOR AND RFID TAGS USING THE SAME

(71) Applicant: SAKURA TECH CORPORATION, Kawasaki-shi (JP)

(72) Inventors: Mitsuo Makimoto, Kawasaki (JP); Fuminori Sakai, Kawasaki (JP)

(73) Assignee: SAKURA TECH CORPORATION, Kawasaki-Shi, Kanagawa (JP)

( * ) Notice: Subject to any disclaimer, the term of this patent is extended or adjusted under 35 U.S.C. 154(b) by 1 day.

(21) Appl. No.: 14/572,914

(22) Filed: Dec. 17, 2014

(65) Prior Publication Data

US 2015/0302231 A1 Oct. 22, 2015

(30) Foreign Application Priority Data

Mar. 27, 2014 (JP) ................................. 2014-066877

(51) Int. Cl.
*H01P 1/203* (2006.01)
*G06K 19/067* (2006.01)
*H01P 7/08* (2006.01)
*G01S 13/75* (2006.01)

(52) U.S. Cl.
CPC ......... *H01P 1/20363* (2013.01); *G01S 13/753* (2013.01); *G06K 19/0672* (2013.01); *H01P 7/082* (2013.01)

(58) Field of Classification Search
CPC ............... G01S 13/753; G06K 19/0672; H01P 1/20363; H01P 1/20371; H01P 7/082; H01P 7/08; H01P 7/084; H01P 7/086; H01P 7/088
See application file for complete search history.

(56) References Cited

U.S. PATENT DOCUMENTS 9,090,451 B1 * 7/2015 Pan ........................ B81B 3/0021
2005/0174182 A1 * 8/2005 Aikawa ................ H03B 5/1852
331/107 SL (Continued)

FOREIGN PATENT DOCUMENTS

JP 2005-122585 A 5/2005
WO 93/06504 A1 4/1993

(Continued)

OTHER PUBLICATIONS

Zhou; A High Selectivity Quadruple Mode BPF With Two Short Circuited Stub Loaded SIRS; Progres in Electromagnetic Research letters, vol. 24; May 2011.*

(Continued)

*Primary Examiner* — Hirdepal Singh
(74) *Attorney, Agent, or Firm* — Buchanan Ingersoll & Rooney PC

(57) ABSTRACT

Chipless RFID tags and a tag system are provided, wherein the stepped impedance higher-order mode resonator includes two sets of composite transmission lines each set having an equal line length and including a plurality of transmission lines each having a plurality of specific levels to which the transmission line characteristic impedance is assigned, the two sets of composite transmission lines each connected in series, the sets being connected at the center to form an electrically symmetrical configuration and wherein the chipless RFID tags and the tag system allow each of the codes to be assigned to each of the structures of the stepped impedance higher-order mode resonator, and allow each of those codes to be identified by detecting each of the combinations of the higher-order mode resonance frequencies that may be produced from each the structures of the resonator that corresponds to each of the codes that have been assigned.

11 Claims, 13 Drawing Sheets

Diagram of Structure of Multimode Resonator having Open-circuited End

(56) References Cited

U.S. PATENT DOCUMENTS

| | | | | | |
|---|---|---|---|---|---|
| 2006/0066422 | A1* | 3/2006 | Itoh | H01P 7/082 | 333/219 |
| 2011/0291836 | A1* | 12/2011 | Deavours | G06K 19/07773 | 340/572.7 |
| 2013/0082790 | A1* | 4/2013 | Trivedi | H03L 7/099 | 331/117 FE |
| 2013/0175872 | A1* | 7/2013 | Simon | H02J 5/005 | 307/104 |
| 2014/0035703 | A1* | 2/2014 | Ma | H01P 1/20336 | 333/204 |
| 2014/0232482 | A1* | 8/2014 | Wada | H01P 1/20381 | 333/134 |
| 2016/0164485 | A1* | 6/2016 | Sekiya | H01P 7/082 | 333/174 |

FOREIGN PATENT DOCUMENTS

| | | | |
|---|---|---|---|
| WO | 2009/126999 | A1 | 10/2009 |
| WO | WO2015061827 | * | 5/2015 |

OTHER PUBLICATIONS

Stevan Preradovic et al., "Chipless RFID: Bar Code of the Future", IEEE Microwave Magazine, vol. 11, No. 7, pp. 87-97, Dec. 2010.

Tooru Nomura et al., "Development of Functional Surface Acoustic Wave Sensor—Saw Sensor With RFID Tags", The Institute of Electronics, Information and Communication Engineers, Technical Report ED2005-116, pp. 33-38, Sep. 2005 (with English Abstract).

Morikazu Sagawa et al., "Geometrical Structures and Fundamental Characteristics of Microwave Stepped Impedance Resonators", Electronic The Institute of Electronics, Information and Communication Engineers, Technical Report MW95-118, pp. 25-30, Dec. 1995 (with English Abstract).

Chung-I G. Hsu et al., "Tri-Band Bandpass Filter With Sharp Passband Skirts Designed Using Tri-Section SIRs", IEEE Microwave and Wireless Component Letters, vol. 18, No. 1, pp. 19-21, Jan. 2008.

Chung-I G. Hsu et al., "Tri-Band filter With sharp Passband Skirts Designed Using Tri-Section SIRs", IEE Microwave and Wireless Componenets Letters, Jan. 2008, pp. 19-21, vol. 18, No. 1 (3 pages).

* cited by examiner

Diagram of Structure of Multimode Resonator having Short-circuited End

Diagram for Explaining How the Characteristics of Multimode Resonator having Open-circuited End can be Analized Diagram for Explaining How the Characteristics of Multimode Resonator having Short-circuited End can be Analized Example 1 of Multimode SIR in accordance with one Embodiment of Present Invention Example 2 of Multimode SIR in accordance with one Embodiment of Present Invention Example 3 of Multimode SIR in accordance with one Embodiment of Present Invention Example 4 of Multimode SIR in accordance with one Embodiment of Present Invention Example 1 of Chipless RFID tag in accordance with one Embodiment of Present Invention Example 2 of Chipless RFID tag in accordance with one Embodiment of Present Invention (A) Unitary Transmission Lines (B) Example of Tag Structure

MULTIMODE RESONATOR AND RFID TAGS USING THE SAME

BACKGROUND OF THE INVENTION

Field of the Invention

The present invention relates to a multimode resonator using the transmission lines and proposes to provide any of the techniques whereby the higher-order mode resonance frequencies can be varied by changing the structure of the resonator mentioned above. The present invention also relates to any of the methods for providing the structures of RFID tags and a tag system whereby the code information can be assigned to the structure of the multimode resonator and each of the codes is made to correspond to each of the combinations of the higher-order mode resonance frequencies that are produced in response to each corresponding structure of the resonator so that the code can be associated with each corresponding combination of the higher-order mode resonance frequencies.

Description of the Relevant Art

Bar codes are used widely in the inventory management, the goods distribution management and other similar managements, and may have some distinguished features because ID tags can be printed out and are very inexpensive. The bar codes have several problems associated with the tag reliability because it is poor, however. Specifically, the tag reliability problems may includes the problems in that the tags cannot be kept confidential or secret (that is, they are completely exposed), the tags are easy to be recognized incorrectly if when they are contaminated or dirty, and are easy to be exposed to any act of altering the tags improperly. Other problems may include the problems in that the area over which the tags can be read is restricted and the presence of some obstacles or obstructions, if any, might prevent the tags from being read correctly.

The conventional version of the RFID (Radio Frequency Identification) which is implemented on any semiconductor chip has been used more widely and is primarily intended to eliminate the problems mentioned above. In this respect, the conventional RFID has some distinguished features in that the tags can be both read and written easily.

It should be noted, however, that the tags that have been composed of the semiconductor chips implemented on printed circuit board may become high costly and have several problems in that the tags cannot be used under the high temperature environment that may cause the semiconductor chip to operated improperly or under the environment in which the tags are exposed to the strong radiation rays.

The present invention concerns the chipless RFID tags which are provided to replace the conventional bar code function.

In accordance with one embodiment of the present invention, the chipless RFID tags are provided so that they can essentially take advantage of the resonance characteristics of the transmission line resonator. This allows the internal circuit not to be exposed to the outside, that is, not to be seen from the outside. In this respect, the tag information can be kept more confidential or secret and the resistance to any act of altering the tags can become much stronger than that for the conventional bar codes. As other features, the tag information can be read out regardless of the presence of any type of obstacles or obstructions such as paper, cloth, wood and the like other than metal and the tags can be embedded in any type of objects such as the living body when they are miniaturized so that they can operate with the millimeter wave band. In addition, those tags can be implemented on the passive circuit, and they can be operated in the wider temperature range or under the environment in which the tags may be exposed to the radiation rays without being operated improperly.

In accordance with the present invention, the RFID tags are not so cost competitive as the bar code tags and the RFID does not require so many functions as the conventional version of the RFID that was implemented on the semiconductor chip. The tags can be used in those applications or environments in which the tags cannot be used or are difficult to be used.

There are various technologies for the chipless RFID that are disclosed in the documents cited below and have been used in the practical applications.

RELEVANT TECHNICAL DOCUMENTS

Patent Documents

Patent Document 1: Japanese patent application No. 2005-122585 (unexamined)

Nonpatent Documents

Nonpatent Document 1: P. Preradovic and N. C. Karmakar, "Chipless RFID: Bar Code of the Future", IEEE Microwave Magazine, vol. 11, No. 7, pp. 87-97, December 2010

Nonpatent Document 2: Nomura, Arai, Kosaka and Saito, "Development of Multifunction Elastic Surface Wave—Development of SAW RFID", The Institute of Electronics, Information and Communication Engineers, Technical Report ED2005-116, pp. 33-38, September 2005

Nonpatent Document 3: Sagawa and Makimoto, "The Structure and Essential Characteristics of Impedance Stepped Microwave Resonator", Electronic The Institute of Electronics, Information and Communication Engineers, Technical Report MW95-118, pp. 25-30, December 1995

Nonpatent Document 4: C. G. Hsu. C. H. Lee and Y. H. Hsieh, "Tri-band Bandpass Filter with Sharp Passband Skirts Designed Using Tri-section SIRs", IEEE Microwave and Wireless Component Letters, vol. 18, No. 1, pp. 10-21, January 2008

Nonpatent Document 1 is the paper in which the chipless RFID tags are discussed and the general technology for this field is disclosed.

Nonpatent Document 1 describes the examples in which various resonator elements are structured as shown in FIG. 11, which are directly associated with the present invention. This document discloses the structure of the multi-resonator in which essentially one bit corresponds to one resonator. For this reason, the document 1 has several problems in that the resonator must be manufactured more accurately and that the tags must become larger as the number of the resonator that corresponds to multiple bits is increasing.

Nonpatent Document 2 discusses that the Surface Acoustic Wave (SAW) devices are utilized, and discloses the tags that carries the information as it is associated with the difference in the signal propagation time delay as well as the system to which those tags can be applied.

Patent Document 1 discloses the tag examples in which a great number of MEMS resonators that have been constructed with the fine working process are used.

Nonpatent Document 2 and Patent Document 1 both have the distinguished features from the aspect of reducing the manufactured resonators into the smaller sizes, but the costs involving the fine working process may become high and the amount of information which the tags can carry is not so large.

SUMMARY

It may be appreciated from the foregoing description that for the prior art chipless ID tags provided by the conventional technology, there are problems in that it is demanded that the requirements for the accurate fine working process must be met and that the tags must be larger if the amount of the information to be carried by the tags is to be increased while the costs must be higher if the tags are to be reduced into the smaller size.

It is therefore desired that the problems described above must be solved in order to meet the following requirements.

1) The resonator must have the simple structure that allows it to be manufactured with the sufficient fine working precision.
2) The amount of the information to be carried by the tags must be larger and the resonator must be able to be extended in the future.
3) The costs required for the tags must be reduced.

The resonator provided by employing the conventional chipless RFID tags has the structure in which the resonance frequencies must be different for each resonator and one bit must be made to correspond to one resonator as described above.

In accordance with the present invention, however, the RFID tags are implemented by the transmission line type multimode resonator that allows the higher-order mode resonance frequencies produced from this type resonator to be controlled by varying the structure of the resonator.

Firstly, the structure of the resonator as well as the resonance characteristics will be described below.

The resonator of the present invention has its basic structure called as the Stepped Impedance Resonator (SIR) that includes a plurality of transmission lines each having a different characteristic impedance and connected to each other. In the following description and accompanying drawings, the Stepped Impedance Resonator will be referred simply to "SIR".

This type resonators are disclosed in Nonpatent Documents 3 and 4 which describe that the microwave filters using the structure and characteristics of the resonator has been developed and used for the practical applications.

Nonpatent Document 3 describes that the spurious resonance (higher-order mode resonance) can be controlled by taking advantage of the SIR's basic characteristics and structure.

Nonpatent Document 4 describes the examples of the three-band filter that has been designed to use the SIR having the three different type impedance lines and include the three passbands using the higher-order mode resonance frequencies such as the 1st-order, 2nd-order and 3rd-order resonance frequencies.

Although the resonator of the present invention also employs the SIR having the multi-section structure, the structures described in Nonpatent Documents 3 and 4 have been extended to allow for the usage of up to the Nth-order's higher-order resonance mode (N refers to two or more positive integers).

The present invention provides the chipless RFID tags and the tag system, wherein the stepped impedance higher-order mode resonator includes two sets of composite transmission lines each set having an equal line length and including a plurality of transmission lines each having a plurality of specific discrete line impedance levels and connected in series so that the two sets can be connected at the center to form the electrically symmetrical configuration and wherein each of the codes is made to correspond to each of the structures of the resonator and is assigned to each of the structures of the resonator so that each of the codes can be identified by detecting the combination of the higher-order mode resonance frequencies produced from the corresponding structure of the resonator.

In accordance with the present invention, any particular ID can be generated by allowing each of the structures of the transmission line type resonator to control the higher-order mode resonance frequencies produced from the resonator and by taking advantage of such control function.

It is known to the prior art that the resonance frequencies are varied for each structure of the resonator so that one bit information can be assigned for each resonance frequency.

The present invention provides a technique by which the code information is assigned to each of the structures of the resonator and any difference in the combination of the higher-order resonation mode frequencies from the resonator that are produced for each of the codes can be detected.

The invention according to Claim 1 provides a multimode resonator comprising:

two sets of composite transmission lines each set having an equal electric length and including "N" transmission lines (in which "N" refers to two or more positive integers) each having either of "m" specific discrete values for the transmission line characteristic impedance (in which "m" refers to two or more positive integers) and connected in series, said two sets of composite transmission lines being so connected at the center as to form a symmetrical electric circuit configuration and having the opposite terminals one of which is an open terminal and the other of which is a short-circuit terminal, the "N"th-order's higher-order mode resonance frequency being designated as the reference frequency $f_N$ and the line electric length being equal to 90 degrees.

The invention according to Claim 2 provides RFID tags using the multimode resonator as defined in Claim 1, wherein the RFID tags allow each of the "$m^N$" codes to be assigned to each of the "$m^N$" structures of the resonator that are produced by combinations of the line impedances of the transmission lines, and allow each of those codes to be identified by detecting each of the combinations of the "N" higher-order mode resonance frequencies ranging between from $\{(k-1)\cdot N+1\}$th-order to $(k\cdot N)$th-order (in which k refers to one or more positive integers) that are produced for each of the structures of the resonator that corresponds to each of the codes.

The invention according to Claim 3 provides a multimode resonator comprising:

parallel coupled composite transmission lines including "N" parallel coupled lines (in which "N" refers to two or more positive integers) each having an equal coupled line electric length and having any of "m" specific discrete values specified for the even-odd geometric mean line impedances (in which m refers to two or more positive integers), the "N" parallel coupled lines (in which "N" refers to two or more positive integers) each having any of the "j" specific values specified for the coupling degrees of the parallel coupled lines and being connected to the two opposite terminals of the parallel coupled composite transmission lines connected in series, the two remaining terminals being designated as the open terminals or short-circuit terminals and the Nth-order's higher-order mode frequency being designated as the reference frequency $f_N$ in which the line electric length can be equal to 90 degrees.

The invention according to Claim 4 provides RFID tags using the multimode resonator as defined in Claim 3 wherein the RFID tags allow each of the "$(m \cdot j)^N$" codes to be assigned to each of the "$(m \cdot j)^N$" structures of the resonator that are produced by combinations of the even-odd mode geometric mean line impedances of the parallel coupled transmission lines with the coupling degrees, and allow each of those codes to be identified by detecting each combination of the "N" higher-order mode resonance frequencies ranging from {(k−1)·N+1}th-order to (k·N)th-order (in which k refers to one or more positive integers) that are produced for each of the structures of the resonator that corresponds to each of the codes.

The invention according to Claim 5 provides RFID tags as defined in Claim 2 or 4, wherein a transmitting antenna and a receiving antenna each having a bandwidth over which the "N" higher-order mode resonance frequencies ranging from (k−1)·N+1th-order to (k·N)th-order (in which k refers to one or more positive integers) can be detected are connected to the two open terminals or two short-circuit terminals of the resonator.

The invention according to Claim 6 provides RFID reader using the RFID tags as defined in any one of Claims 2, 4 and 5 and comprising a transmitter antenna and a receiving antenna each having a bandwidth over which the "N" higher-order mode resonance frequencies ranging from ({(k−1)·N+1})th-order to (k·N)th-order (in which k refers to one or more positive integers) can be detected and including a transmitting/receiving control, a transmitter, a receiver, a frequency detector, a code table and a code detector.

The invention according to Claim 7 provides RFID tag reader as defined in Claim 6, wherein the "N" higher-order mode resonance frequencies ranging from the {(k−1)·N+1}th-order to the (k·N)th-order (in which k refers to one or more positive integers) that have been detected are first normalized by dividing them by the reference frequency $f_N$ or the k·Nth-order resonance frequency $f_{kN}$, and are then normalized with the reference frequency $f_N$ or the k·Nth-order resonance frequency $f_{kN}$ in the same manner, allowing each of the codes to be identified by looking to the code table that has previously been prepared.

The invention according to Claim 8 provides RFID tag system using the FRID tags as defined in any one of Claims 2, 4 and 5, comprising a transmitting antenna and a receiving antenna each having a bandwidth over which the "N" higher-order mode resonance frequencies ranging from the {(k−1)·N+1}th-order to the (k·N)th-order (in which k refers to one or more positive integers) can be detected and including a transmitting/receiving control, a transmitting portion, a receiving portion, a frequency detector, a code table and a code detector.

The invention according to Claim 9 provides RFID tag reader as defined in Claim 8, wherein the "N" higher-order mode resonance frequencies ranging from the {(k−1)·N+1}th-order to the (k·N)th-order (in which k refers to one or more positive integers) that have been detected are first normalized with the reference frequency $f_N$ or by dividing them by the k·Nth-order resonance frequency $f_{kN}$, and are then similarly normalized with the reference frequency $f_N$ or the k·Nth-order resonance frequency $f_{kN}$, allowing the codes to be identified by looking to the code table that has previously been prepared.

The invention according to Claim 10 provides RFID tag system as defined in Claim 9, wherein said code table is provided so that the coordinate in the "N"th-order dimensional space for each of the detected tags can be indicated by the normalized resonance frequencies so that the higher-order mode resonance frequency information can also be indicated by the same coordinate as the first mentioned coordinate and wherein the codes can be indicated by computing the distance between the respective coordinates.

Among the other advantages of the present invention, one is that the resonator can be implemented easily on any suitable print circuit board because any frequencies above the microwave frequency band can be applied to the resonator. This allows the smaller-size and less cost resonators to be manufactured. Another is that the tag information can be read by radio or wirelessly, allowing the tag detecting range to be widened. Thus, the tags can be detected accurately regardless of the presence of any obstructions or obstacles such as paper, cloth, wood and the like. Furthermore, the resonators can be used under the high temperature environment or under the environment in which the tags are exposed to the radiation rays.

Specifically, the present invention provides the following advantageous effects that are presented as the typical examples thereof.

1) Each of the codes is assigned to each of the structures of the multimode resonator that comprises the transmission lines and the smaller-side chipless RFID tags can be obtained by utilizing the higher-order mode resonance frequency that corresponds to the code assigned to the structure.
2) The tag information can be read regardless of the presence of any obstructions or obstacles such as paper, cloth, wood and the like.
3) The resonator can be used under the environment in which the manufacturing process is exposed to the high temperatures or under the environment in which the tags are exposed to the radiation rays
4) The tags can be created at the local workshop.
5) There are a number of frequency bands over which the frequency information can be read and the smaller-size tag reader and antenna can be implemented by selecting the high frequency band from the available frequency bands.

BEST MODES OF EMBODYING THE INVENTION

Figure 1:
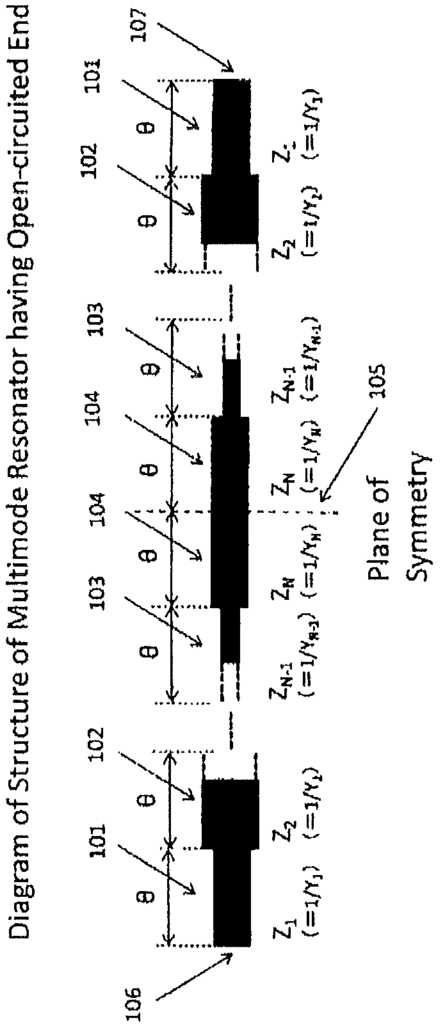
FIG. 1 is a diagram that illustrates the structure of the multimode resonator having the open-circuited end in accordance with one embodiment of the present invention.
Figure 2:
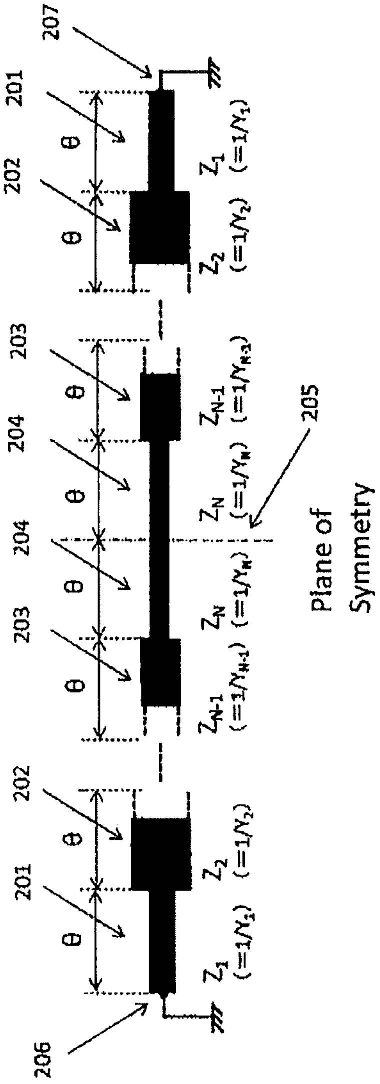
FIG. 2 is a diagram that illustrates the structure of the multimode resonator having the short-circuited end in accordance with one embodiment of the present invention.

The basic structures of the resonator according to the present invention are shown and described in FIG. 1 and FIG. 2, respectively.

The structure shown in FIG. 1 includes two sets of transmission lines connected in series and so connected at the line 104 as to form the electrical symmetric configuration in which reference numerals 101, 102, 103, 104 refer to the respective transmission lines each having an equal line electric length Θ and the respective characteristic impedance $Z_1$, $Z_2$, . . . $Z_{N-1}$, $Z_N$ (the line characteristic admittance $Y_1$, $Y_2$, . . . $Y_{N-1}$, $Y_N$).

Reference numeral 105 refers to the plane of symmetry and reference numerals 106 and 107 refer to the open-circuited ends.

When it is supposed that the frequency of the line having the electric length of 90 degrees is designated as the reference frequency $f_N$, the resonator may be called as the N/2 wavelength type resonator having the open-circuited end.

The resonator provides a great number of resonances, and may be operated so that it can be resonated at the frequencies $f_1$ (1st order) $f_2$ (2nd order), . . . $f_{N-1}$ (N−1th-order) below the reference frequency $f_N$.

In the structure shown in FIG. 1, if it is assumed that all transmission lines have an equal line impedance, the resonator may be called as the uniform line resonator which can produce the resonance frequencies at the interval of the frequencies $f_1=f_N/N$, $f_2=2f_N/N$, . . . $f_{N-1}=(N-1)f_N/N$ and $f_N/N$.

FIG. 2 illustrates the example of the structure of the resonator having the short-circuit terminal in accordance with one embodiment of the present invention.

Similarly to the structure shown in FIG. 1, the structure shown in FIG. 2 includes two sets of transmission lines connected in series and so connected at the line 104 as to form the electrical symmetrical configuration in which reference numerals 201, 202, 203, 204 refer to the respective transmission lines each having an equal line electric length Θ and the respective characteristic impedance $Z_1$, $Z_2$, . . . $Z_{N-1}$, $Z_N$ (the line characteristic admittances $Y_1$, $Y_2$, . . . $Y_{N-1}$, $Y_N$).

Reference numeral 205 refers to the plane of symmetry and reference numerals 206 and 207 refer to the short-circuited ends.

This resonator may be called as the N/2 wavelength type resonator having the short-circuit terminal that comprises the transmission lines having the resonance characteristics like those of the resonator in FIG. 1.

Next, the SIR resonator having the structure shown in FIG. 1 will be discussed below.

Figure 3:
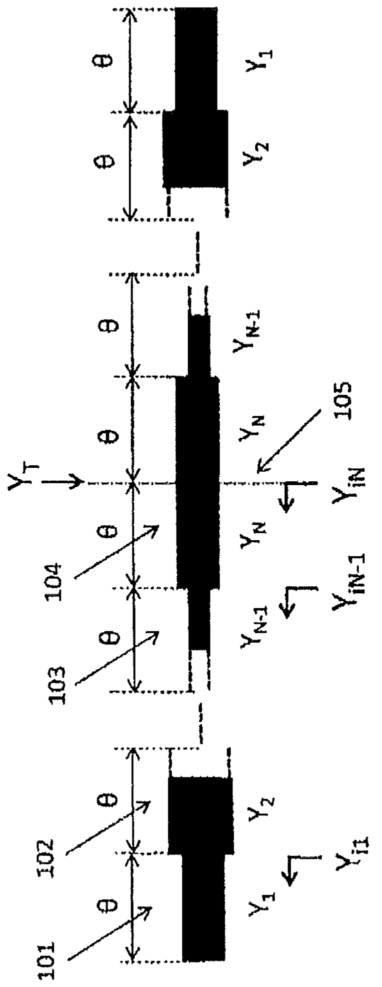
FIG. 3 is a diagram that illustrates the structure of the multimode resonator having the open-circuited end in accordance with one embodiment of the present invention.

As shown in FIG. 3, it is assumed that the admittance as the open-circuited end is viewed from the center of the resonator is designated as $Y_{iN}$, the admittance as the open-circuited end.

is viewed from the connecting point between the k-th line and the (k−1)-th line is designated as $Y_{ik}$, and the input admittance as it is viewed from the center of the lines of the whole resonator is designated as $Y_T$. Under the above assumption, the following equation (Equation 1) can be obtained in which the input admittance can be expressed in terms of the recurrence formula.

$$Y_T=2Y_{iN}$$

$$Y_{iN}=Y_N(Y_{iN-1}+jY_N\tan\theta)/(Y_N+jY_{iN-1}\tan\theta)$$

. . .

$$Y_{ik}=Y_k(Y_{ik-1}+jY_k\tan\theta)/(Y_k+jY_{ik-1}\tan\theta)$$

. . .

$$Y_{i2}=Y_2(Y_{i1}+jY_2\tan\theta)/(Y_2+jY_{i1}\tan\theta)$$

$$Y_{i1}=jY_1\tan\theta \qquad \text{[Equation 1]}$$

It is then assumed that the resonance frequency in the kth-order's higher-order mode resonance is designated as $f_k$ and the corresponding electric length is designated as $\theta_k$. Under the above assumption, the resonance conditions can be obtained as $Y_T\rightarrow\pm\infty$ when k is any odd number and as $Y_T\rightarrow0$ when k is any even number. As described previously, if k=N, the result is $\theta_N$=90 degrees (=π/2 (rad)).

Next, the resonance frequencies of the SIR having the short-circuited end in the structure shown in FIG. 2 will be discussed.

Figure 4:
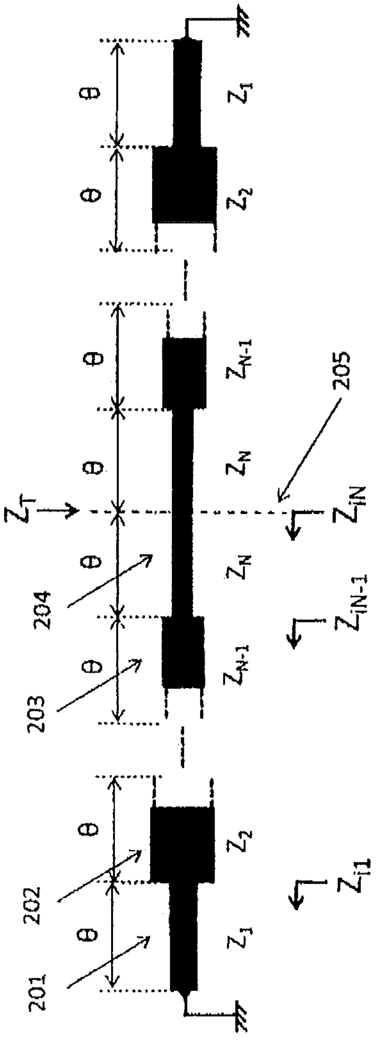
FIG. 4 is a diagram that is provided for explaining how the characteristics of the multimode SIR having the short-circuited end can be analyzed in accordance with one embodiment of the present invention.

As shown in FIG. 4 and in this case, it is assumed that the admittance as the open-circuited end is viewed from the center of the resonator is designated as $Y_{iN}$, the admittance as the open-circuited end is viewed from the connecting point between the kth line and the (k−1)-th line is designated as $Y_{ik}$, and the input admittance as it is viewed from the center of the lines of the whole resonator is designated as $Y_T$. Under the above assumption, the following equation (Equation 2) can be obtained in which the input admittance can be expressed in terms of the recurrence formula.

$$Z_T=2Z_{iN}$$

$$Z_{iN}=Z_N(Z_{iN-1}+jZ_N\tan\theta)/(Z_N+jZ_{iN-1}\tan\theta)$$

. . .

$$Z_{ik}+Z_k(Z_{ik-1}+jZ_k\tan\theta)/(Z_k+jZ_{ik-1}\tan\theta)$$

. . .

$$Z_{i2}=Z_2(Z_{i1}+jZ_2\tan\theta)/(Z_2+jZ_{i1}\tan\theta)$$

$$Z_{i1}=jZ_1\tan\theta \qquad \text{[Equation 2]}$$

For the resonator having the structure shown in FIG. 4, it is assumed that the resonance frequency in the k-th order's higher-order mode resonance is designated as $f_k$ and the corresponding electric length is designated as $\theta_k$. Under the above assumption, the resonance conditions can be obtained as $Z_T\rightarrow\pm\infty$ when k is any odd number and as $Z_T\rightarrow0$ when k is any even number. As described previously, if k=N, the result is $\theta_N$=90 degrees (=π/2 (rad)).

As its specific example, the SIR having the open terminal N=2 (one wavelength resonator) is considered. Then, the following equation (Equation 3) can be obtained.

$$Y_T = j2Y_2(Y_1\tan\theta + Y_2\tan\theta)/(Y_2 - Y_1\tan^2\theta) = j2Y_2(1+R_{Z1})\tan\theta/(R_{Z1} - \tan^2\theta) \quad \text{[Equation 3]}$$

The impedance ratio is defined as $R_{Z1}=Z_2/Z_1=Y_2/Y_1$

From the above, the resonance conditions can be found by the following equation (Equation 4).

$$\tan_2\theta_1=R_{Z1}$$

$$\theta_2=\pi/2 \quad \text{[Equation 4]}$$

It is then assumed that the resonance frequencies below the Nth-order resonance frequency are normalized with the Nth-order resonance frequency and the kth-order mode normalized frequencies are designated as $F_k$ (k=1~N−1).

If N=2, the following equation (Equation 5) is obtained.

$$F_1=f_1/f_2=\theta_1/\theta_2=(2/\pi)\tan^{-1}\sqrt{R_{Z1}} \quad \text{[Equation 5]}$$

If any particular structure of the resonator (which includes the impedances $Z_1$, $Z_2$ in this instance) can then be given, the normalized resonance frequencies $F_1$, $F_2$ (=1.0) will be found. Conversely, if the two resonance frequencies are given, the respective values of θ1 and the impedance ratio will be able to be found.

The line impedances have some degree of freedom such that from the impedance ratio, the other impedance may be found by specifying either one of the two impedances. Then, the structure of the resonator can be determined by specifying the resonance frequencies.

For the resonator having the short-circuited end, however, the impedance may be obtained in place of the admittance of the resonator, and if the impedance ratio is defined as $R_{Z1}=Z_2/Z_1$, the same equation as the equation described above can be obtained. Thus, the discussion can proceed as for the resonator having the open-circuited end.

For N=3, the result is that the 3/2 wavelength SIR will be obtained. In this instance, the discussion can also proceed by finding the input admittance for the resonator having the open-circuited end.

For the impedance ratio $R_{Z2}=Z_2/Z_3=Y_3/Y_2$, the following equation (Equation 6) will be obtained.

$$Y_T = 2Y_{i3} = 2Y_3(Y_{i2} + jY_3\tan\theta)/(Y_3 + jY_{i2}\tan\theta) = j2Y_3\cdot(A_3/B_3) \quad \text{[Equation 6]}$$

Here, $A_3$ and $B_3$ may be obtained from the following respective equations (Equation 7).

$$A_3=(1+R_{Z1}+R_{Z1}\cdot R_{Z2}-R_{Z2}\tan^2\theta)\cdot\tan\theta$$

$$B_3=R_{Z1}\cdot R_{Z2}-(1+R_{Z1}+R_{Z2})\cdot\tan^2\theta \quad \text{[Equation 7]}$$

Then, the input admittance will be expressed as the function of tan θ and the impedance ratio $R_{Z1}$ and $R_{Z2}$.

The following equation (Equation 8) will be obtained by using the above equation to consider the resonance conditions.

$$\tan^2\theta_1=R_{Z1}\cdot R_{Z2}/(1+R_{Z1}+R_{Z2})$$

$$\tan^2\theta_2=(1+R_{Z1}+R_{Z1}\cdot R_{Z2})/R_{Z2}$$

$$\theta_2=\pi/2 \quad \text{[Equation 8]}$$

If any particular structure of the resonator is given, therefore, the impedance ratio will be found, and the electric length will then be obtained from the above equation, from which the resonance frequencies can be determined.

For N=3, it can also be found that the higher-order mode resonance frequencies will be changed by varying the impedance ratio.

Conversely, if each of the higher-order mode resonance frequencies $f_1$, $f_2$, $f_3$ is given, the respective electric lengths can be found by the following respective equations (Equation 9) since $\theta_3=\pi/2$ (rad).

$$\theta_1=(\pi/2)\cdot(f_1/f_2)=(\pi/2)\cdot F_1$$

$$\theta_2=(\pi/2)\cdot(f_2/f_2)=(\pi/2)\cdot F_2 \quad \text{[Equation 9]}$$

Then, $R_{Z1}$, $R_{Z2}$ will be found by the following respective equations (Equation 10), from which the structure of the resonator can be determined.

$$R_{Z1}=\{(1+\tan^2\theta_2)\cdot\tan^2\theta_1\}/(1+\tan^2\theta_1)$$

$$R_{Z2}=(1+2\tan^2\theta_1+\tan^2\theta_1\cdot\tan^2\theta_2)/(\tan^2\theta_2-\tan^2\theta_1) \quad \text{[Equation 10]}$$

In this instance, however, it is noted that the solution $R_{Zi}>0$ will not always exist.

Although the specific instances of N=2 and N=3 have been described above. For the generalized instance of N, the input admittance may be given as the functions of tan θ and the impedance ratio $R_{Zk}$ (k=1~N−1 integers).

Once all the line impedances have been given and the structure of the resonator has then been determined, the impedance ratio $R_{Zk}$ can be obtained.

By substituting the specific values for $R_{Zk}$ in the input admittance equation, the (N−1) values for $\theta_i$ (i=1~N−1 integers) can be obtained for each of the ith-order resonance modes, and the electric length and the normalized resonance frequencies can be determined by solving the equation.

In this instance, $\theta_N=\pi/2$ (rad) will also apply.

For the multisection type SIR having the open-circuited end or the short-circuited end and including the transmission lines each having an equal electric length as described above, it may be found that the higher-order mode resonance frequencies can be changed by varying the line impedances regardless of the number N of the sections.

Once the particular structure has been determined, it may be found that the higher-order mode resonance frequencies that will then be produced from that structure can also be determined uniquely.

It may be appreciated from the above description that the present invention provides the RFID tags that are implemented by taking advantage of the characteristics of the multisection SIR.

EXAMPLES

Figure 5:
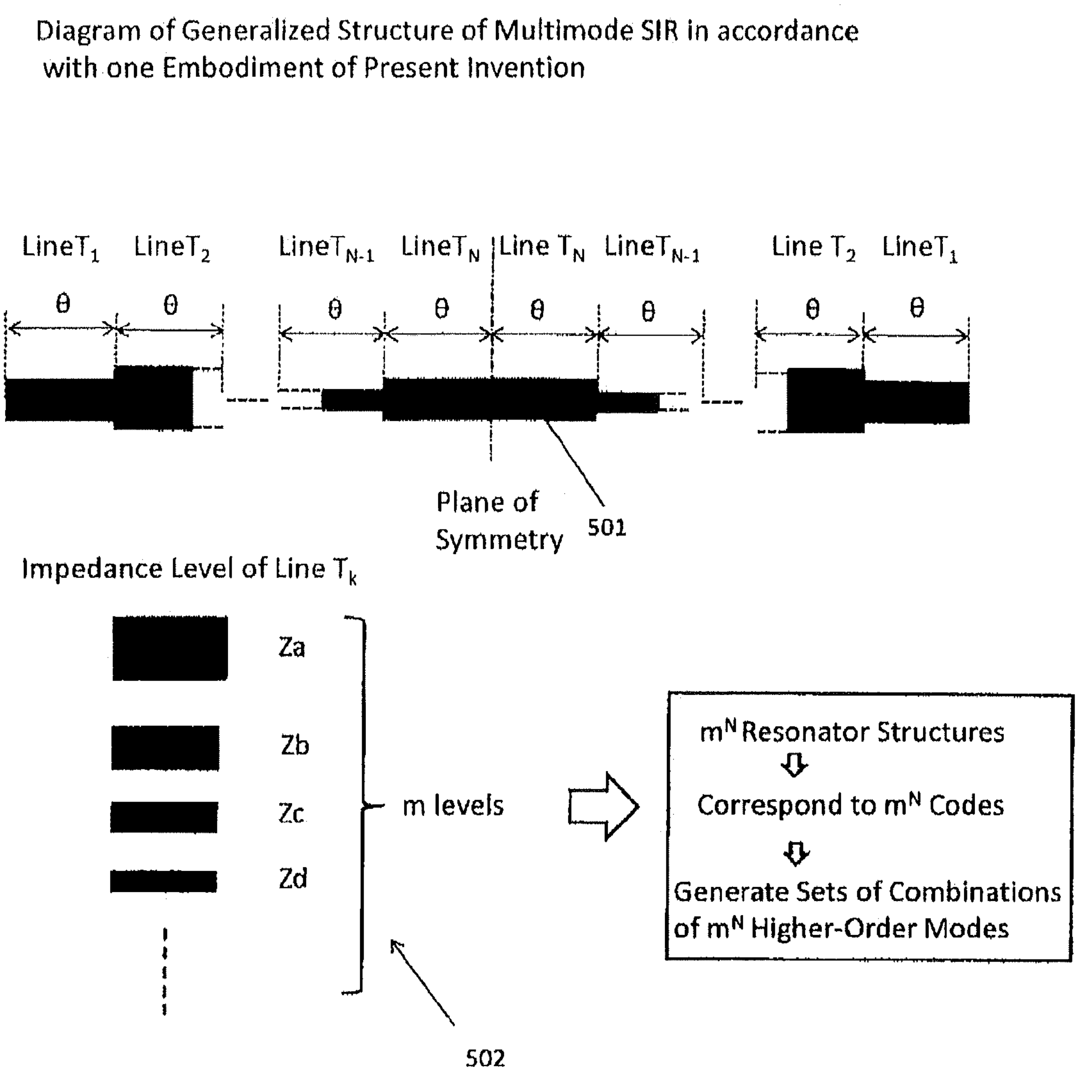
FIG. 5 is a diagram that illustrates the generalized structure of the multimode SIR in accordance with one embodiment of the present invention.

FIG. 5 illustrates the generalized structure of the multimode resonator that is based on the multisection SIR in accordance with one embodiment of the present invention.

The resonator, which is generally designated as 501, includes two sets of transmission lines $T_1, T_2, \ldots, T_{N-1}, T_N$ each having an equal electric length and connected in series, those two sets being coupled together at the line $T_N$ to form the electrically symmetric configuration, both the ends of which take the form of the open-circuited ends. Both the ends may take the form of the short-circuited ends.

The resonator having the structure described above provides the N/2 wavelength type resonator, in the structure of which N≥2 is assumed.

In the following description, it is now supposed that the resonator has the structure that includes the line characteristic impedances of the line $T_k$ whose impedance levels are restricted to the "m" levels of the discrete values $Z_a$, $Z_b$, $Z_c$ as indicated by 502.

Since there are "N" transmission lines, the resonator should have the "$m^N$" structures.

The multimode SIR described above has the characteristics from which the resonator can have the "m" structures while the "$m^N$" combinations of the higher-order mode resonance frequencies from the $1^{st}$-order to the Nth-order are also available, and if the structure of the resonator has been determined, it is also possible to determine the combinations of the higher-order mode resonance frequencies.

This permits each of the codes to be assigned to each of the structures of the resonator, and each of the codes can be made uniquely to correspond to each of the combinations of the higher-order mode resonance frequencies.

By measuring all of the "N" higher-order mode resonance frequencies from the $1^{st}$-order to the Nth-order, on the other hand, each of the codes (which corresponds to each of the structures of the resonator) can be identified for each of the combinations, which can be applied to RFID.

Although the number of the codes may be increased by increasing m and N, the resonator will become larger as N is increased. It is therefore preferred that m should be increased because this can reduce the resonator into the smaller size.

Figure 6:
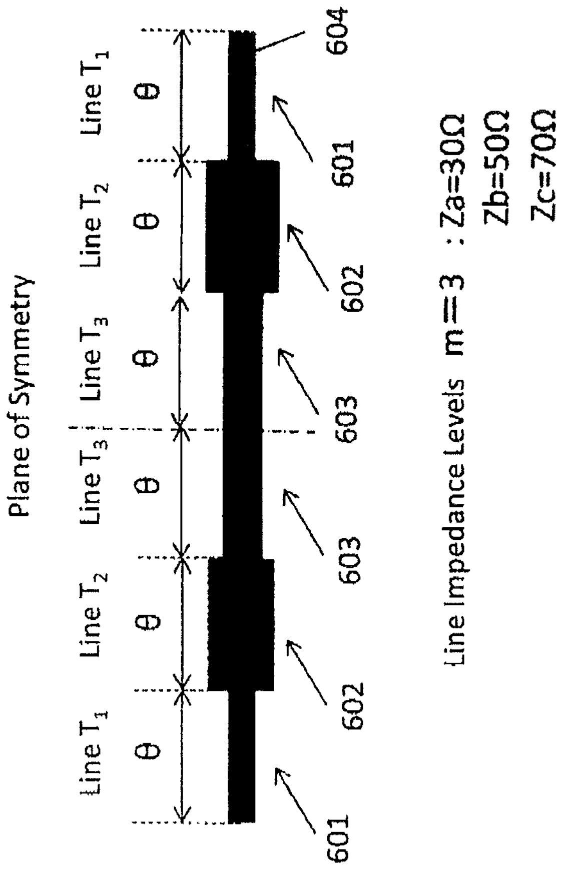
FIG. 6 is a diagram that illustrates the example 1 of the multimode SIR in accordance with one embodiment of the present invention.

FIG. 6 illustrates the example of the multimode resonator in accordance with one embodiment of the present invention.

In this example, the resonator 604 is the N=3 (3/2 wavelength type) SIR that includes the transmission lines 601, 602, 603 in which the number of line characteristic impedance levels is m=3. From the following impedance levels:

a: $Z_a$=30Ω, b: $Z_b$=50Ω, c: $Z_c$=70Ω it is attempted that the respective numbers of the codes and the higher-order mode resonance frequencies are to be obtained.

In this instance, it is expected that the $3^3$=27 codes will be generated as described above.

It is now supposed that each of the codes will be assigned to each of the resonator structures by providing the combinations of the line impedances a, b, c as indicated by the code #00~26 in Table 1.

TABLE 1

| | Combination of Lines | | | Normalized Resonant Frequencies (F3 = 1.0) | | | | | |
|---|---|---|---|---|---|---|---|---|---|
| Code No. | T1 | T2 | T3 | F1 | F2 | F3 | F4 | F5 | F6 |
| # 00 | a | a | a | 0.333 | 0.667 | 1.000 | 1.333 | 1.667 | 2.000 |
| # 01 | b | a | a | 0.377 | 0.714 | 1.000 | 1.283 | 1.622 | 2.000 |
| # 02 | c | a | a | 0.403 | 0.745 | 1.000 | 1.251 | 1.595 | 2.000 |
| # 03 | a | b | a | 0.322 | 0.571 | 1.000 | 1.929 | 1.677 | 2.000 |
| # 04 | b | b | a | 0.378 | 0.622 | 1.000 | 1.377 | 1.621 | 2.000 |
| # 05 | c | b | a | 0.412 | 0.658 | 1.000 | 1.339 | 1.585 | 2.000 |
| # 06 | a | c | a | 0.304 | 0.507 | 1.000 | 1.494 | 1.697 | 2.000 |
| # 07 | b | c | a | 0.364 | 0.559 | 1.000 | 1.441 | 1.637 | 2.000 |
| # 08 | c | c | a | 0.404 | 0.597 | 1.000 | 1.403 | 1.597 | 2.000 |
| # 09 | a | a | b | 0.286 | 0.715 | 1.000 | 1.285 | 1.715 | 2.000 |
| # 10 | b | a | b | 0.322 | 0.756 | 1.000 | 1.245 | 1.678 | 2.000 |
| # 11 | c | a | b | 0.343 | 0.783 | 1.000 | 1.218 | 1.658 | 2.000 |
| # 12 | a | b | b | 0.286 | 0.623 | 1.000 | 1.387 | 1.215 | 2.000 |
| # 13 | b | b | b | 0.333 | 0.667 | 1.000 | 1.333 | 1.667 | 2.000 |
| # 14 | c | b | b | 0.364 | 0.699 | 1.000 | 1.302 | 1.637 | 2.000 |
| # 15 | a | c | b | 0.275 | 0.559 | 1.000 | 1.442 | 1.725 | 2.000 |
| # 16 | b | c | b | 0.392 | 0.604 | 1.000 | 1.397 | 1.672 | 2.000 |
| # 17 | c | c | b | 0.364 | 0.638 | 1.000 | 1.363 | 1.637 | 2.000 |
| # 18 | a | a | c | 0.254 | 0.747 | 1.000 | 1.254 | 1.747 | 2.000 |
| # 19 | b | a | c | 0.286 | 0.783 | 1.000 | 1.218 | 1.715 | 2.000 |
| # 20 | c | a | c | 0.304 | 0.803 | 1.000 | 1.194 | 1.697 | 2.000 |
| # 21 | a | b | c | 0.258 | 0.659 | 1.000 | 1.341 | 1.740 | 2.000 |
| # 22 | b | b | c | 0.302 | 0.699 | 1.000 | 1.302 | 1.699 | 2.000 |
| # 23 | c | b | c | 0.392 | 0.727 | 1.000 | 1.274 | 1.672 | 2.000 |
| # 24 | a | c | c | 0.254 | 0.597 | 1.000 | 1.403 | 1.746 | 2.000 |
| # 26 | b | c | c | 0.302 | 0.637 | 1.000 | 1.363 | 1.698 | 2.000 |
| # 26 | c | c | c | 0.333 | 0.667 | 1.000 | 1.333 | 1.667 | 2.000 |

Each of the structures of the resonator that corresponds to each of the codes can be determined from each of the codes assigned to each corresponding structure, from which the impedance ratios $R_{Z1}$ and $R_{Z2}$ for each of the codes can be determined and the electric length can be obtained from the resonance condition equation.

From this, the normalized resonance frequencies F2, F3 (=1.0) can be determined.

In Table 1, F4, F5, F6 (=2.0) are also presented.

The code #00, #13, #26 show the cases in which the resonator includes the three transmission lines each having an equal line impedance, which represents the uniform line resonator that produces the higher-order mode resonance frequencies all of which are equal.

Except for the above instance, the higher-order mode resonance frequencies that are produced are all different.

This means that any combination of the codes that produces the higher-order mode resonance frequencies all of which are equal should be avoided previously and that the other combinations of the codes should be assigned so that all the codes can be identified by detecting the higher-order mode resonance frequencies.

Table 1 also shows that F3−F1=F5−F3 and F3−F2=F4−F3, from which it is apparent that F1 and F5 and also F2 and F4 are located symmetrically around F3.

This means that the electric length θ of the resonator can be determined as $\tan^2\theta_k$=A (any positive integer).

This also means that the frequency information may be obtained by detecting F1, F2, F3 or by detecting F4, F5, F6.

The tan is the periodic function, from which the solution to $\theta=n\pi+\theta_k$ can also be obtained (n is any positive integer).

With this resonance frequency being designated as f and with the normalized resonance frequency being designated as F, the following equation (Equation 11) will result. Then, the higher-order mode resonance frequencies may also occur periodically.

$$F=f/f_N=\theta/\theta_N=(n\pi+\theta_k)/(\pi/2)=2n+F_k \quad \text{[Equation 11]}$$

It follows from the above that for N=3, the codes can also be identified by detecting F7, F8, F9 or F10, F11, F12

When the frequency information is read via the antenna, it is demanded that the antenna should have the bandwidth which is enough to cover at least the "N" higher-order mode resonance frequencies that will occur successively.

If the value obtained by dividing the required bandwidth by its center frequency is assumed to be the relative bandwidth, then the relative bandwidth will be approximately 2(N−1)/(N+1) if the 1st-order to Nth-order frequencies are detected or will be approximately 2(N−1)/(5N+1) if the (N+1)th-order to 2Nth-order frequencies are detected or will be approximately 2(N−1)/(5N+1) if the (2N+1)th-order to the 3Nth-order frequencies are detected.

For N=3, therefore, about 100%, about 40% and about 25% will be achieved for the respective relative bandwidths, from which it is apparent that the relative bandwidth required for the antenna can be reduced into the smaller size if the higher-order mode resonance frequencies above the reference frequency $f_N$ are to be detected.

The small wavelength provides the smaller-size antenna, and the smaller tags and the smaller-size tag reader can be provided if the higher frequencies are to be detected.

It may be appreciated from the above that the mitigation of the requirements for the antenna's bandwidth and the provision of the smaller-size antenna are among the features of the present invention.

Figure 7:
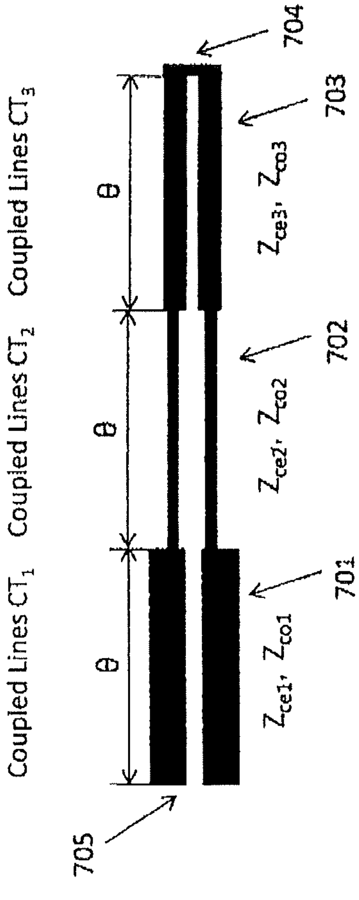
FIG. 7 is a diagram that illustrates the example 2 of the multimode SIR in accordance with one embodiment of the present invention.

FIG. 7 illustrates the example 2 of the multimode resonator in accordance with one embodiment of the present invention.

This example is provided to illustrate the 3/2 wavelength type SIR having an open-circuited end and using the parallel coupled lines As shown in the example of FIG. 6, the resonator having the structure described above includes the two sets of transmission lines $T_1$, $T_2$, $T_3$ so that the two sets can be connected with each other at the line T3 to form the symmetrical configuration. In the example of FIG. 7, on the other hand, the resonator includes two sets of transmission lines so that the two sets can be connected with each other to form the parallel coupled line configuration.

In FIG. 7, reference numerals 701, 702 and 703 denote the coupled lines $CT_1$, $CT_2$ and $CT_3$, reference numeral 704 denotes the connecting point and reference numeral 705 denotes the open-circuited end.

This structure reduces the resonator into the smaller size.

Although the parallel coupled lines may be represented as having the odd-mode impedance $Z_{co}$ and the even-mode impedance $Z_{ce}$, the resonator can be designed by considering the geometric mean impedance $Z_c$ and the coupling coefficient k that are given by the following equation (Equation 12).

the geometric mean impedance: $Z_c = \sqrt{Z_{co} \cdot Z_{ce}}$ the degree of coupling: $k = (Z_{ce} - Z_{co})/(Z_{ce} + Z_{co})$ [Equation 12]

The relationship between $Z_{co}$ and $Z_{ce}$ may be expressed by the following equations (Equation 13).

$$Z_{co} = Z_c \sqrt{(1-k)/(1+k)}$$

$$Z_{ce} = Z_c \sqrt{(1+k)/(1-k)} \quad \text{[Equation 13]}$$

In accordance with one embodiment of the present invention, the resonator using the coupled transmission lines has the two open-circuited end whose potentials have the phases opposite to each other in the odd-order resonance mode. In this mode, the resonator is operated to resonate in the odd mode so that only the odd mode line impedance $Z_{co}$ may be considered.

For the even-order resonance mode, on the other hand, the resonator is operated to resonate in the even-order mode so that only the even-order mode impedance $Z_{ce}$ may be considered.

It may be apparent from the above that the conditions under which the multimode SIR having the parallel coupled transmission lines should be operated to resonate are also related to the coupling coefficient besides the line impedance. Thus, the number of levels for the degree of coupling may be added to this line structure.

It is now assumed that the number of levels for $Z_c$ is designated as m and the number of levels for the degree of coupling k is designated as j, then the number of levels for the line structure will be m·j, which means that for the number of parallel coupled lines being N, $(m \cdot j)^N$ codes can be generated. This can increase the number of codes to be generated.

For the structure using the parallel coupled lines, however, the connecting point 704 will enable the resonance frequencies to be shifted to the lower frequency band. It is therefore necessary to correct the line length of the parallel coupled line 703 so that it can become short enough to allow the resonator to resonate with the reference frequency $f_N$.

Figure 8:
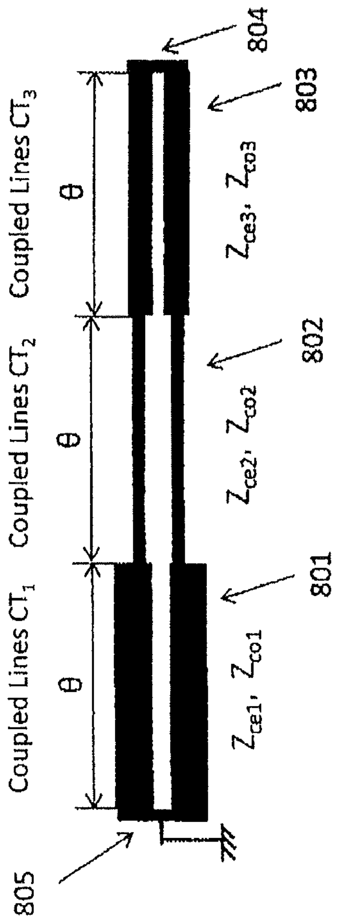
FIG. 8 is a diagram that illustrates the example 3 of the multimode SIR in accordance with one embodiment of the present invention.

FIG. 8 illustrates the example 3 of the multimode resonator in accordance with one embodiment of the present invention.

In this example, it is shown that the resonator uses the parallel coupled lines but the 3/2 wavelength type SIR has the short-circuited end differently from the resonator shown in the example of FIG. 7.

In FIG. 8, reference numerals denote the coupled lines $CT_1$, $CT_2$, $CT_3$, reference numeral 804 denotes the connecting point and reference numeral 805 denotes the short-circuit terminal.

This example differs from the example of FIG. 7 in that the resonator has the open-circuited end or the short-circuited end, but it may be thought that the resonator in this example operates basically in the same manner as that in the example 7. It is also necessary to correct the resonator's length by using the connecting point 804.

For the RFID tag structure, the resonator may be coupled with any external device such as by the magnetic coupling. The resonator using this magnetic coupling may be expected to have many applications.

Figure 9:
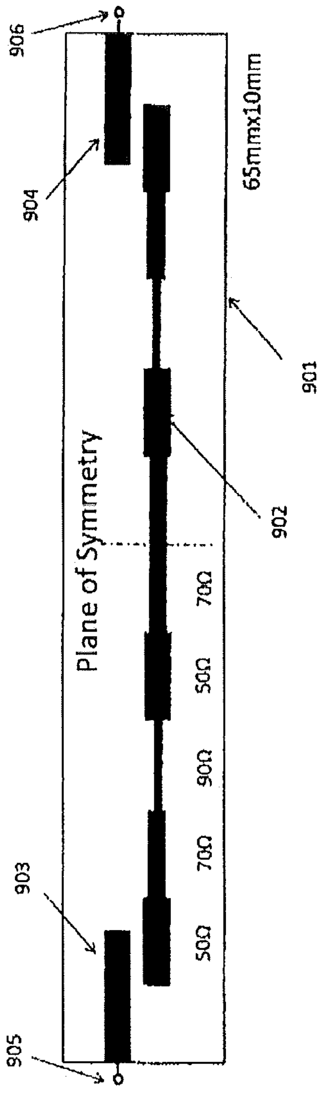
FIG. 9 is a diagram that illustrates the example 4 of the multimode SIR in accordance with one embodiment of the present invention.

FIG. 9 illustrates the example 4 of the multimode resonator in accordance with one embodiment of the present invention.

In FIG. 9, reference numeral 901 denotes a dielectric substrate and reference numeral 902 denotes the multimode resonator having the number of sections N=5 and the number of impedances m=3.

In FIG. 8, reference numeral 903, 904 denote the input/output lines which are parallel coupled with the lines having the open terminal in the resonator.

The coupling length is designed to be 60 degrees for the reference frequency ($f_5$). Reference numerals 905 and 906 denote the input and output terminals If the substrate has the dielectric constant of 2.2 and the thickness of 0.5 mm with the reference frequency being $f_5$=10.0 GHz, it will have the dimensions of 65 mm×10 mm as shown. When the five lines having the respective impedance characteristic of 50Ω/70Ω/90Ω/50Ω/70Ω as shown are chosen, this circuit will have the transmission characteristics as shown in FIG. 10.

Figure 10:
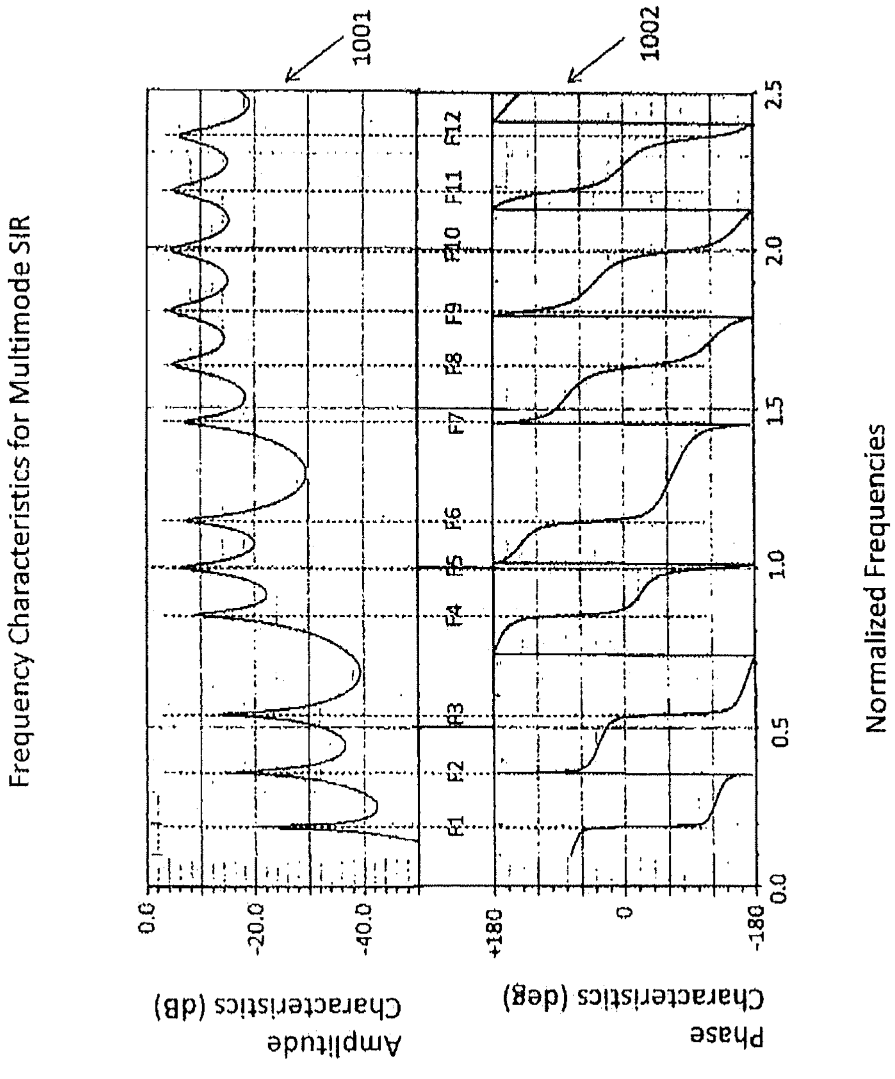
FIG. 10 is a diagram that illustrates the frequency characteristics of the multimode SIR in the example 4.

In FIG. 10, the upper graph presents the amplitude characteristic curve and the lower graph presents the phase characteristic curve, with the horizontal axis presenting the frequency normalized with the reference frequency $f_5$.

It may be apparent from FIG. 10 that the amplitude characteristic curve has a sharp peak value at each of the resonance points and the phase characteristic curve has the phases varied by 180 degrees near the resonance points.

This shows that the resonance frequencies can be detected accurately when they are provided in each of the higher-order mode resonances.

This also shows that the normalized frequencies are $F_1$=0.19, $F_2$=0.36, $F_3$=0.54, $F_4$=0.85, $F_5$=1.00, $F_6$=1.15, $F_7$=1.46, $F_8$=1.64, $F_9$=1.81, $F_{10}$=2.00 and that $F_4$, $F_3$, $F_2$, $F_1$ and $F_6$, $F_7$, $F_8$, $F_9$ are located symmetrically across the center of the normalized reference frequency $F_5$ in the same manner shown in the example 1.

In this example, it is shown that the frequencies $F_6$ to $F_{10}$ have a high amplitude level, which means that the coupling length for the input/output coupled lines 903, 904 has been set to 60 degrees in order to permit the frequencies to be detected easily within this frequency band.

By detecting the frequencies $F_6$ to $F_{10}$ in the manner described above, the antennal can be reduced into the smaller size and the requirements for the bandwidth can be mitigated accordingly.

Although N=5 is provided in this example, it is general that in accordance with the N/2 wavelength multi-section SIR of the present invention, each of the codes can be identified by detecting the "N" resonance frequencies within the frequency bands from {(k−1)·N+1}th-order to (k·N)th-order (k represents one or more integers).

Figure 11:
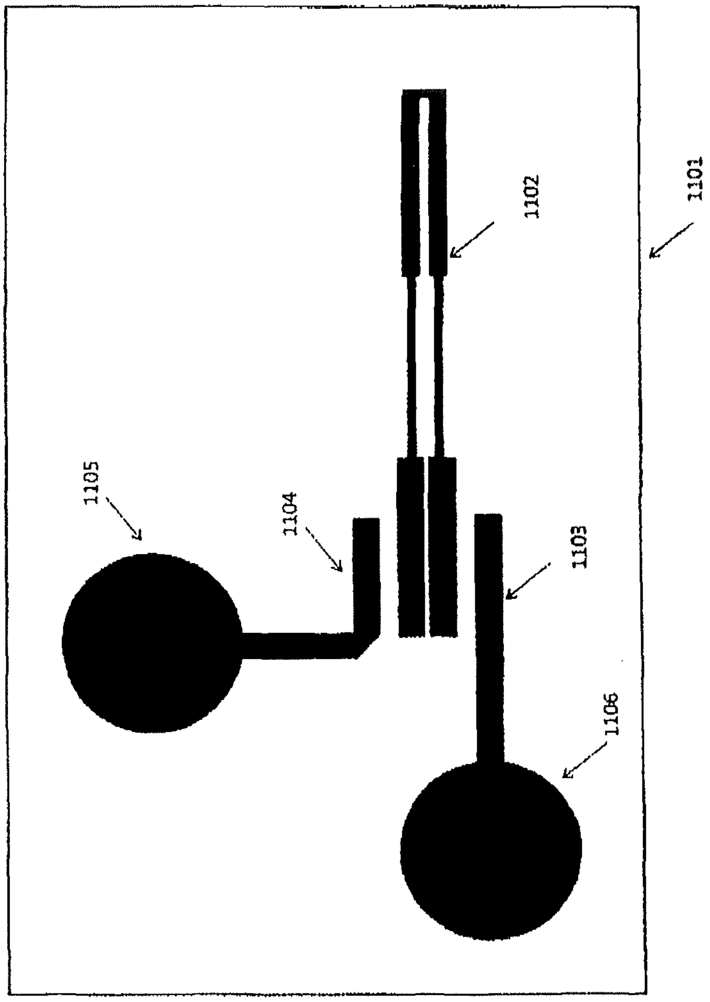
FIG. 11 is a diagram that illustrates the example 1 of the chipless RFID tags in accordance with one embodiment of the present invention.

FIG. 11 illustrates the example 1 of the chipless RFID tag in accordance with one embodiment of the present invention.

In the example shown in FIG. 11, a dielectric substrate is provided 1101 which includes parallel coupled transmission lines 1103, 1104, the multimode SIR resonator 1102 having the open-circuited end, and transmitting and receiving antennas 1105, 1106.

As it is required that those antennas should have the broad bandwidth, the circular monopole antenna or the like such as the one in FIG. 11 may be applied. It is noted, however, that the antenna itself can be of any type.

As shown in this example, the antennas have orthogonal planes of polarization so that the input and output radio waves can be separated from each other.

The structure shown in FIG. 10 allows the tag reader to read the tags by identifying the reflected waves from the surrounding areas (which may cause a background noise) and the reflected waves from the tags.

Besides the antennas having the orthogonal planes of polarization, the circular polarization antennas that are known to the prior art may be employed in order to identify the polarized waves.

The antenna's size will usually become larger than the resonator's size if the detected frequencies are low. In order to reduce the size of each of the tags, therefore, the higher-order mode resonance frequencies that are as high as possible should be detected. In this way, the antenna can be designed so that its center frequency can be set to be higher. This will provide a useful means for reducing the size of the tag.

The low loss of the resonator is not the requirement as compared with the resonator used for the conventional multi-resonator tag. The dielectric substrate may be made of any transparent plastics material and the conductor may be made of any transparent electrode material. This will provide a transparent RFID that ensures that the tag information can be kept secret or confidential and the higher security can be achieved.

Figure 12:
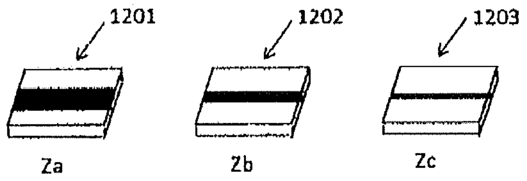
FIG. 12 is a diagram that illustrates the example 2 of the chipless RFID tags in accordance with one embodiment of the present invention.
Figure 12:
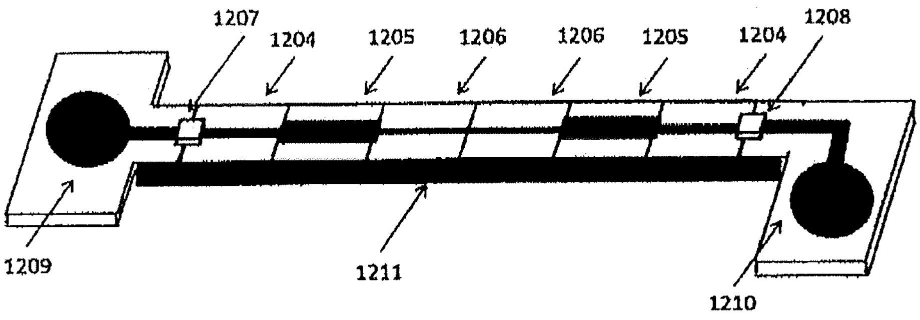

FIG. 12 illustrates the example 2 of the chipless RFID tag in accordance with one embodiment of the present invention. The structure in this example includes (A) unitary transmission lines and (B) RFID tag.

Reference numerals 1201, 1202, 1203 denote the unitary transmission lines each made of the same-size dielectric substrate and having a characteristic impedance $Z_a$, $Z_b$, $Z_c$.

Reference numerals 1209, 1210 denote the transmitting and receiving antennas.

As shown in the example of (B) the RFID tag in FIG. 12, the RFID tag can be created easily by using the transmission lines and antennas described above.

In this example, reference numeral 1204 may be replaced by the transmission line Zb, reference numeral 1205 may be replaced by the transmission line $Z_a$, and reference numeral 1206 may be replaced by the transmission line $Z_c$. The multimode SIR may be provided so that it includes the two sets of those transmission lines, each set being connected at the center to form the electrically symmetrical configuration. It further includes the resonator and antennas which are fixed in position by using the substrate holder 1211. Thus, the RFID tag may be achieved by connecting the resonator and antennas with the coupling capacity as indicated by reference numerals 1207, 1208.

The RFID tags can be created readily at the local workshop if a great number of unitary transmission lines and antennas are provided.

The number of the codes to be identified can also be increased if the different types of the unitary transmission lines are provided or if the fixing holders are made to be longer in order to increase the number N of sections.

Figure 13:
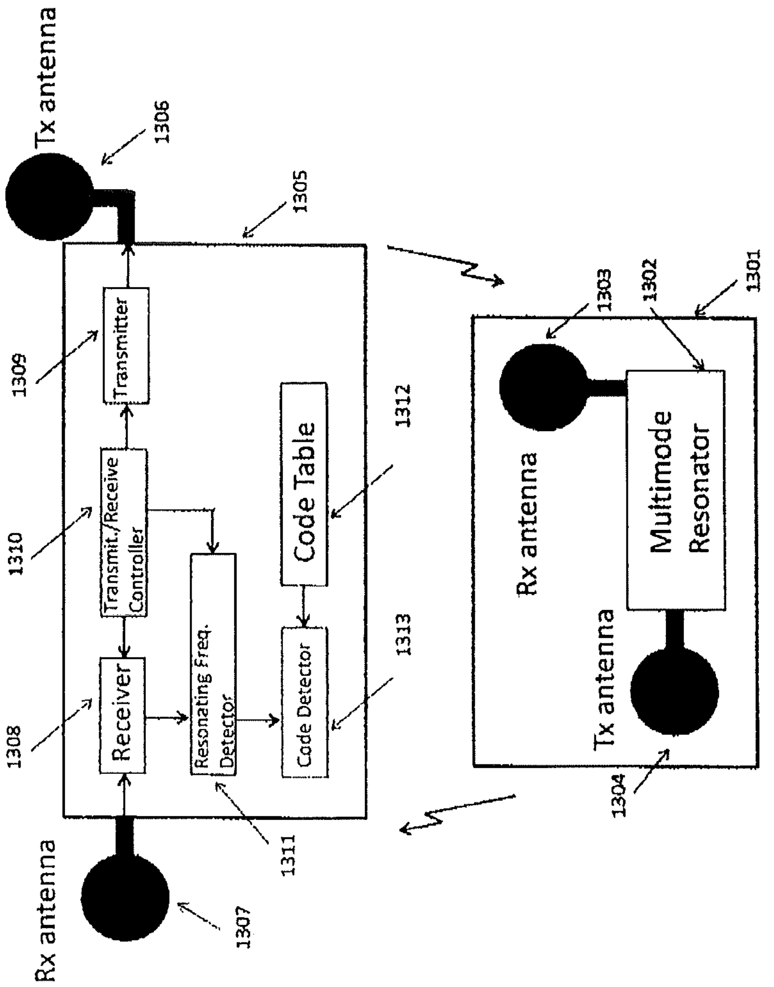
FIG. 13 is a diagram that is provided for explaining the chipless RFID tag system in accordance with one embodiment of the present invention.

FIG. 13 is a diagram that is provided for explaining the tag system using the chipless RFID tag in accordance with one embodiment of the present invention.

In FIG. 13, reference numeral 1301 denotes the chipless RFID tag and reference numeral 1305 denotes the tag reader.

The RFID tag includes the multimode resonator 1302 provided by the present invention, the receiving (Rx) antenna 1302 and the transmitting (Tx) antenna 1304.

The tag reader 1305 includes the transmitting (Tx) antenna 1306, the receiving (Rx) antenna 1307, the signal receiver 1308, the signal transmitter 1309, the transmitting/receiving controller 1310, the frequency detector 1311, the code table 1312 and the code detector 1313.

The transmitting and receiving antennas for the tag and tag reader are arranged so that the planes of polarization can be orthogonal with respect to each other.

In order to read the tag information correctly, it is preferred that any suitable means should be provided for turning either of the tag or tag reader so that the transmitting antenna and the receiving antenna can have the respective planes of polarization oriented in the same direction.

The transmitter in the tag reader 1305 acts as the interrogator for the tags and is operated to transmit the frequency sweep signals and the impulse signals via the transmitting antenna 1306.

In the RFID tag 1301, the signals transmitted via the transmitting antenna are received, and the multimode resonator is made to resonate so that the signals carrying the frequency characteristics are transmitted via the transmitting antenna.

The tag reader receives those signals which are then amplified by the receiver 1308. Then, the resonance frequency detector 1311 detects the higher-order mode resonance frequencies in response to the frequency sweep signals and impulse signals received by the detector 1311.

In the code detector, the coders for the ID tags can be identified by performing the computation from the combination of the higher-order mode resonance frequencies received by the code detector or by looking to the code table 1312 that has previously been prepared.

The resonance frequencies produced from the resonator may be subjected to the variations due to the surrounding temperature or they may be varied under the effect of the physical parameters of the dielectric substrate such as the dielectric constant of the substrate.

In most cases, it can be assumed that the direction in which the variation may be shifted up or down is the same as the direction in which each of the higher-order mode resonance frequencies may occur and that the amounts by which the shifts occur relatively to each other may be substantially equal. In the frequency detector, therefore, the higher-order mode resonance frequency that has been measured will be normalized with the reference frequency $f_N$ that has also been measured or will be normalized with the resonance frequency $f_{kN}$ that is any integral multiple (k) of the reference frequency, and the code table will also be created by using the same normalized resonance frequencies. By looking to this code table and then processing it, the errors that may occur due to the frequency variations can be reduced and each of the codes can then be identified.

It may be thought, however, that the code table for the (N/2) wavelength multi-section SIR tags is provided so that the coordinate (position) of each of the tags in the Nth-order dimensional space can be indicated by the corresponding normalized frequency. It is then assumed that the higher-order mode normalized frequencies from the $1^{st}$-order to the Nth-order for the code i and the code j are $F_{1i}$, $F_{2i}$, . . . $F_N$ and $F_{1j}$, $F_{2j}$, . . . $F_N$, respectively. It may be thought that the inter-code distance between the code i and the code j corresponds to the distance between the coordinates in the Nth-order dimensional space. Accordingly, the inter-code distance D (i,j) may be defined as follows.

$$D(i,j)=\sqrt{(F_{1i}-F_{1j})^2+(F_{2i}-F_{2j})^2+\ldots+(F_{Ni}-F_{Nj})^2} \quad \text{[Equation 14]}$$

Assuming that the higher-order mode normalized frequencies for the tags that have been detected are designated as the respective coordinate data $F_{1x}$, $F_{2x}$, . . . $F_{Nx}$, the above equation may be used to find the inter-code distance to the particular tag code coordinate that exists in the code table, and the $code_k$ that satisfies the equation D(x,k)=0 (the coordinates are the same) can be identified as the code that should be detected.

Actually, there may be cases in which any errors that may occur will cause the inter-code distance not to be equal to zero (0). In such cases, the code whose inter-code distance is equal to the minimum value may be selected as the candidate. It is therefore the best way that the codes will be identified by considering the relative inter-code distances to the other codes.

Although the present invention has been described with reference to some particular preferred embodiments thereof shown in the accompanying drawings, it is not limited to those embodiments. It should be understood that the present invention may be modified in numerous ways or manners without departing from the spirit and scope as defined in the appended claims.

What is claimed is:

1. A multimode resonator comprising:

two sets of composite transmission lines each set having an equal electric length and including "N" transmission lines (in which "N" refers to four or more positive integers) each having "m" specific discrete values for the transmission line characteristic impedance (in which "m" refers to two or more positive integers) and connected in series, said two sets of composite transmission lines being so connected at the center as to form a symmetrical electric circuit configuration and having opposite terminals one of which is an open-circuited end and the other of which is a short-circuited end, wherein an "N"th-order's higher-order mode resonance frequency is designated as the reference frequency $f_N$ and the line electric length is equal to 90 degrees.

2. RFID tags using the multimode resonator as defined in claim 1, wherein the RFID tags allow each "$m^N$" code to be assigned to each of the "$m^N$" structures of the resonator that are produced by combinations of the line impedances of the transmission lines, and allow each of the "$m^N$" codes to be identified by detecting each of the combinations of the "N" higher-order mode resonance frequencies ranging between from {(k−1)·N+1}th-order to (k·N)th-order (in which k refers to one or more positive integers) that are produced for each of the structures of the resonator that corresponds to each of the codes.

3. RFID tags as defined in claim 2, wherein a transmitting antenna and a receiving antenna each having a bandwidth over which the "N" higher-order mode resonance frequencies ranging from (k−1)·N+1th-order to (k·N)th-order (in which k refers to one or more positive integers) can be detected are connected to the two open terminals or two short-circuit terminals of the resonator.

4. RFID reader using the RFID tags as defined in claim 3 and comprising a transmitter antenna and a receiving antenna each having a bandwidth over which the "N" higher-order mode resonance frequencies ranging from (k−1)·N+1th-order to (k·N)th-order (in which k refers to one or more positive integers) can be detected and including a transmitting/receiving control, a transmitter, a receiver, a frequency detector, a code table and a code detector.

5. RFID tag reader as defined in claim 4, wherein the "N" higher-order mode resonance frequencies ranging from the {(k−1)·N+1}th-order to the (k·N)th-order (in which k refers to one or more positive integers) that have been detected are first normalized by dividing them by the reference frequency $f_N$ or the k·Nth-order resonance frequency $f_{kN}$, and are then normalized with the reference frequency $f_N$ or the k·Nth-order resonance frequency $f_{kN}$ in the same manner, allowing each of the codes to be identified by looking to the code table that has previously been prepared.

6. RFID tag system using the RFID tags as defined in claim 3, comprising a transmitting antenna and a receiving antenna each having a bandwidth over which the "N" higher-order mode resonance frequencies ranging from the {(k−1)·N+1}th-order to the (k·N)th-order (in which k refers to one or more positive integers) can be detected and including a transmitting/receiving control, a transmitting portion, a receiving portion, a frequency detector, a code table and a code detector.

7. RFID tag system as defined in claim 6, wherein the "N" higher-order mode resonance frequencies ranging from the {(k−1)·N+1}th-order to the (k·N)th-order (in which k refers to one or more positive integers) that have been detected are first normalized with the reference frequency $f_N$ or by dividing them by the k·Nth-order resonance frequency $f_{kN}$, and are then similarly normalized with the reference frequency $f_N$ or the k·Nth-order resonance frequency $f_{kN}$, allowing the codes to be identified by looking to the code table that has previously been prepared.

8. RFID tag system as defined in claim 7, wherein said code table is provided so that the coordinate in the "N"th-order dimensional space for each of the detected tags can be indicated by the normalized resonance frequencies so that the higher-order mode resonance frequency information can also be indicated by the same coordinate as the first mentioned coordinate and wherein the codes can be indicated by computing the distance between the respective coordinates.

9. A multimode resonator comprising:

parallel coupled composite transmission lines including "N" parallel coupled lines (in which "N" refers to four or more positive integers) each having an equal coupled line electric length and having any of "m" specific discrete values specified for the even-odd geometric mean line impedances (in which m refers to two or more positive integers), the "N" parallel coupled lines (in which "N" refers to four or more positive integers) each having any of the "j" specific values specified for the coupling degrees of the parallel coupled lines and being connected to the two opposite terminals of the parallel coupled composite transmission lines connected in series, the two remaining terminals being designated as open-circuited ends or short-circuited ends, and an Nth-order's higher-order mode frequency is designated as the reference frequency $f_N$ in which the line electric length can be equal to 90 degrees.

10. RFID tags using the multimode resonator as defined in claim 9 wherein the RFID tags allow each of "$(m\cdot j)^N$" codes to be assigned to each of the "$(m\cdot j)^N$" structures of the resonator that are produced by combinations of the even-odd mode geometric mean line impedances of the parallel coupled transmission lines with the coupling degrees, and allow each of the "$(m\cdot j)^N$" codes to be identified by detecting each combination of the "N" higher-order mode resonance frequencies ranging from $\{(k-1)\cdot N+1\}$th-order to $(k\cdot N)$th-order (in which k refers to one or more positive integers) that are produced for each of the structures of the resonator that corresponds to each of the codes.

11. RFID tags as defined in claim 10, wherein a transmitting antenna and a receiving antenna each having a bandwidth over which the "N" higher-order mode resonance frequencies ranging from $(k-1)\cdot N+1$th-order to $(k\cdot N)$th-order (in which k refers to one or more positive integers) can be detected are connected to the two open terminals or two short-circuit terminals of the resonator.

* * * * *